(12) United States Patent
Sharpe et al.

(10) Patent No.: US 11,959,847 B2
(45) Date of Patent: Apr. 16, 2024

(54) SYSTEMS AND METHODS FOR EXTENDED DYNAMIC RANGE DETECTION OF LIGHT

(71) Applicant: CYTONOME/ST, LLC, Bedford, MA (US)

(72) Inventors: Johnathan Charles Sharpe, Hamilton (NZ); Donald Francis Perrault, Jr., Brighton, MA (US); Peter Kiesel, Palo Alto, CA (US)

(73) Assignee: CYTONOME/ST, LLC, Bedford, MA (US)

( * ) Notice: Subject to any disclaimer, the term of this patent is extended or adjusted under 35 U.S.C. 154(b) by 413 days.

(21) Appl. No.: 17/019,044

(22) Filed: Sep. 11, 2020

(65) Prior Publication Data

US 2021/0080368 A1   Mar. 18, 2021

Related U.S. Application Data

(60) Provisional application No. 62/899,551, filed on Sep. 12, 2019.

(51) Int. Cl.
*G01N 15/02* (2006.01)
*G01N 15/0205* (2024.01)
*G01N 15/10* (2006.01)

(52) U.S. Cl.
CPC . *G01N 15/0211* (2013.01); *G01N 2015/1006* (2013.01); *G01N 2015/1081* (2013.01)

(58) Field of Classification Search
CPC ....... G01N 15/0211; G01N 2015/1006; G01N 2015/1081; G01N 2015/0046; G01N 15/1434; G01N 15/1459
See application file for complete search history.

(56) References Cited

U.S. PATENT DOCUMENTS

| 5,107,225 | A | | 4/1992 | Wheatley, III et al. |
| 5,177,381 | A | * | 1/1993 | Friesen ................ H03G 7/001 330/277 |

(Continued)

FOREIGN PATENT DOCUMENTS

WO   WO-2019060812 A1 *   3/2019   ............ G01J 1/4228

OTHER PUBLICATIONS

Burresi M. et al. Bright-white beetle scales optimise multiple scattering of light. Scientific reports. Aug. 15, 2014;4:6075.

(Continued)

*Primary Examiner* — Roy M Punnoose
(74) *Attorney, Agent, or Firm* — McCarter & English, LLP

(57) ABSTRACT

Systems and methods taught herein advantageously provide extended dynamic range capabilities to detect low intensity and high intensity emitted or scattered light from particles at high speeds with high sensitivity. Independently controlled first and second optical detector elements that handle light intensities in different dynamic ranges, large overall dynamic range is created. Signals from the detector elements can be combined to create a single combined signal that has excellent sensitivity over a large dynamic range. The detector systems and methods taught herein are particularly advantageous in particle processing where the population of particles can emit or scatter light over a large range of intensity values. Systems and methods taught herein enable a wide dynamic range, optical signals of related to particles of interest within a single detector's dynamic range can be acquired while other optical signals at light intensities outside the single detector's dynamic range can also be accurately captured.

58 Claims, 11 Drawing Sheets

(56) References Cited

U.S. PATENT DOCUMENTS

| | | | |
|---|---|---|---|
| 5,214,593 A * | 5/1993 | Magnussen, Jr. | G01N 21/274 |
| | | | 702/32 |
| 5,789,737 A | 8/1998 | Street | |
| 6,285,863 B1 | 9/2001 | Zhang | |
| 6,404,281 B1 | 6/2002 | Kobayashi | |
| 6,518,556 B2 | 2/2003 | Staton et al. | |
| 7,683,299 B2 * | 3/2010 | Patt | G01J 1/4228 |
| | | | 250/214 R |
| 9,575,063 B2 | 2/2017 | Li et al. | |
| 11,016,180 B2 * | 5/2021 | Onal | G01S 7/4868 |
| 2003/0058433 A1 * | 3/2003 | Almogy | G01N 21/9501 |
| | | | 356/237.1 |
| 2004/0207836 A1 * | 10/2004 | Chhibber | G01N 21/8806 |
| | | | 356/237.4 |
| 2006/0124832 A1 | 6/2006 | Harmon et al. | |
| 2007/0035653 A1 | 2/2007 | Hong et al. | |
| 2007/0121110 A1 * | 5/2007 | Kralik | G01J 3/0218 |
| | | | 356/318 |
| 2007/0178480 A1 * | 8/2007 | Corson | G16B 25/00 |
| | | | 702/20 |
| 2009/0014630 A1 * | 1/2009 | Patt | G01N 21/645 |
| | | | 250/208.2 |
| 2018/0373017 A1 * | 12/2018 | Dixon | G02B 21/0024 |
| 2019/0094361 A1 * | 3/2019 | Onal | G01S 7/4816 |
| 2019/0107496 A1 * | 4/2019 | Fan | G01J 1/0462 |
| 2021/0247496 A1 * | 8/2021 | Onal | G01S 17/894 |

OTHER PUBLICATIONS

Tiedau, J. et al., "A high dynamic range optical detector for measuring single photons and bright light." arXiv:1805.05811v1 [quant-ph]. May 15, 2018. Downloaded from https://arxiv.org/abs/1805.05881v1.

* cited by examiner

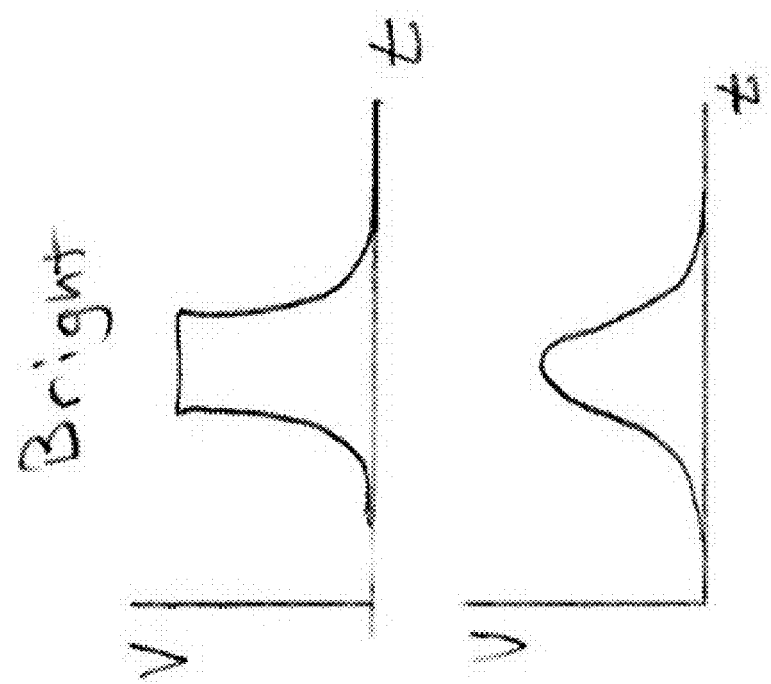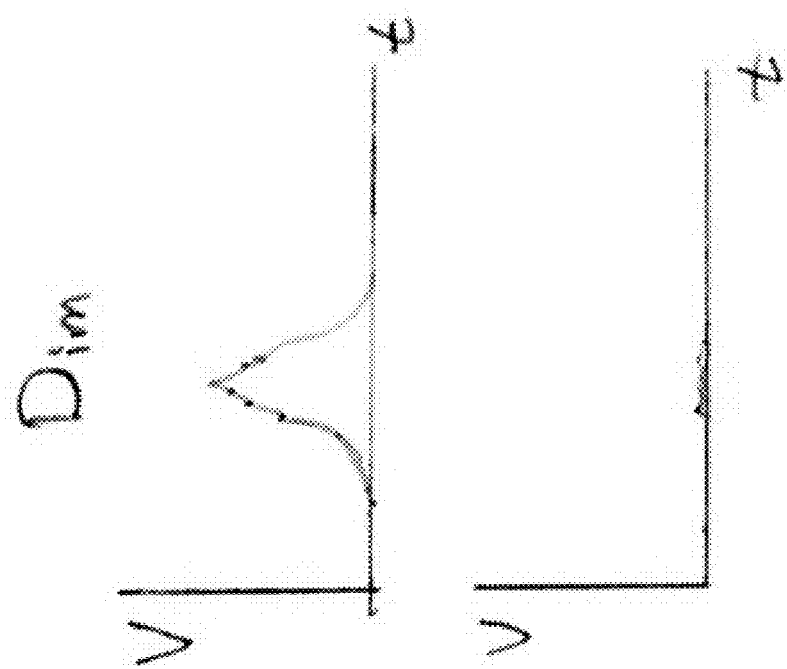
FIG. 2

SYSTEMS AND METHODS FOR EXTENDED DYNAMIC RANGE DETECTION OF LIGHT

RELATED APPLICATION

The present application claims priority to U.S. Provisional Application Ser. No. 62/899,551, filed Sep. 12, 2019, the entire contents of the application are herein incorporated by reference.

BACKGROUND

Fluidic systems, including microfluidic systems, can be used to convey particles through one or more streams in open space or confined to microchannels. Optical systems may be used to monitor, analyze, or detect the particles. For example, particle sorting systems can sort particles in the stream based on a predetermined characteristic detected in the particles using the optical system. In high-throughput systems, light signals gathered by the optical system from the particles are of short duration, and the signal intensity can depend upon the particle characteristic being measured, the position of the optical detector with respect to the particles, and the illuminating light source used to illuminate the particles.

SUMMARY

A detector system with extended dynamic range is provided in accordance with some embodiments taught herein. The detector system includes a first optical detector element having a first dynamic range that receives a first portion of light from an optical source. The first optical detector element generates a first detector output. The detector system also includes a second optical detector element having a second dynamic range that receives a second portion of light from the optical source. The second optical detector element generates a second detector output. The detector system also includes a signal combiner that receives the first detector output and the second detector output and generates a combined signal having greater effective dynamic range than the first dynamic range and the second dynamic range.

A method of detecting light over an extended dynamic range is provided in accordance with some embodiments taught herein. The method includes receiving a first portion of light from an optical source at a first optical detector element having a first dynamic range. The first optical detector element generates a first detector output. The method also includes receiving a second portion of light from the optical source at a second optical detector element. The second optical detector generates a second detector output. The method also includes combining the first detector output and the second detector output to generate a combined signal having greater effective dynamic range than the first dynamic range and the second dynamic range.

BRIEF DESCRIPTION OF THE DRAWINGS

The skilled artisan will understand that the drawings are primarily for illustrative purposes and are not intended to limit the scope of the subject matter taught herein. The drawings are not necessarily to scale; in some instances, various aspects of the subject matter disclosed herein may be exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which:

FIG. 2 illustrates detector outputs for a first optical detector element and a second optical detector element according to some embodiments taught herein under high- and low-intensity illumination conditions;

DETAILED DESCRIPTION

Figure 1:
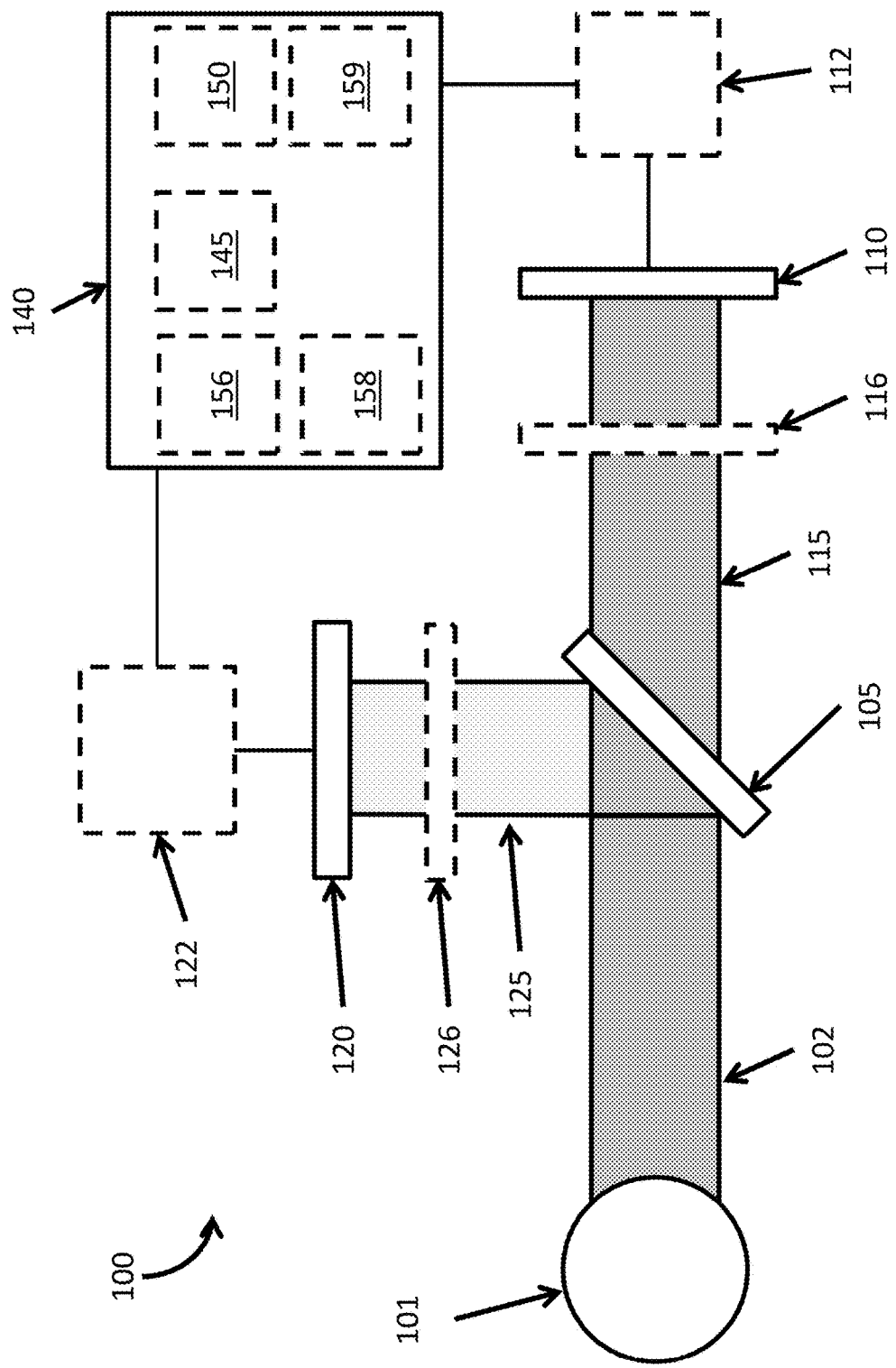
FIG. 1 illustrates a detector system with extended dynamic range in accordance with various embodiments taught herein.

Systems and methods taught herein advantageously provide extended dynamic range capabilities to detect low intensity and high intensity emitted or scattered light from particles at high speeds with high sensitivity. By using independently controlled first and second optical detector elements that handle light intensities in different dynamic ranges, extended dynamic range is realized. In some embodiments, signals from the two optical detector elements can be combined to create a single combined signal that has excellent sensitivity over a large dynamic range (e.g., a dynamic range greater than $10^8$). The detector systems and methods taught herein are particularly advantageous in particle processing where the population of particles can emit or scatter light over a large range of intensity values. Systems and methods taught herein address the conventional detection approach of varying the gain for a single detector to 'focus' in on a particular particle population (e.g., light scatter, fluorescence, or other optical signal). Although the gain of the single detector is altered, it nevertheless remains difficult to measure optical signals from particles that are outside of the dynamic range of the single detector. Because systems and methods taught herein enable an extended dynamic range, optical signals of related particles of interest within a single detector's dynamic range can be acquired while other optical signals at light intensities outside the single detector's dynamic range can also be accurately captured.

Systems and method taught herein enable the combination of two or more individual detector signals into a single signal. As a result, the detectors discussed herein can be integrated into current systems and workflows as if there were just a single high-dynamic-range detector.

The extended dynamic range of systems and methods of the present disclosure enables measurement of fast sequences of light pulses with peak intensity levels ranging from several milliwatts (mW) down to the single photon regime. For example, flow cytometry and Light Detection and Ranging (LIDAR) applications demand reliable detection of fast sequences of very bright and very dim light pulses. In some cases, detection of the dimmest light pulses is achieved using detectors that can perform single photon counting. In some embodiments, detector elements are employed that are particularly resistant to photobleaching and have short recovery times after exposure to intense light. These fast recovery detector elements enable accurate, high resolution detection of sequentially received high- and low-intensity pulses.

Detection of rapidly sequenced light pulses over a large dynamic range is challenging for a number of reasons. First, analog-to-digital converters (ADC) and amplifiers have voltage limits that can limit dynamic range. For a detector with high sensitivity (e.g., a detector with the ability to count single photons), a single photon is conventionally transduced into a ~10 mV analog voltage signal because typical noise levels even in clean electronic environments are a few mV. Conventional detectors have a maximum voltage output of ~2 to 5 V because driving more voltage (e.g., 10 V) into a 50 ohm load can result in power requirements of over 1 Watt. Such high power requirements create difficulties in providing adequate amplifier power. Thus, digital electronics often limit dynamic range to about three orders of magnitude over the detector's response time for a single photon event. If the detection bandwidth is extended to, e.g., 10 times the single-photon detector response time, the dynamic range can be multiplied by 10 to reach a maximum of about $10^4$.

Moreover, detector physics creates challenges to achieve high dynamic range using high sensitivity detectors. For example, in a photomultiplier tube (PMT) or a silicon photomultiplier (SiPM, also known as a pixelated avalanche photodiode), a single photon creates a cascade of $~10^6$ electrons. For a photomultiplier to be sensitive to single photons and have a dynamic range of $10^3$, the detector must be able to dissipate an energy of 30 V*$10^6$*e*$10^3$ within 100 ns, e.g., a power of 0.048 Watts. If the same calculation is performed for a dynamic range of $10^7$, the detector would have to dissipate 480 Watts. This power requirement leads to problematic levels of heating and means that it is not practical to simply increase the dynamic range of single detector elements.

Conventional devices have struggled to provide measurements of particles in a particle processing system over a wide dynamic range. For example, conventional devices often have dynamic ranges of the order of $10^4$ or suffer from non-linear responsivity in the dynamic range. Such devices are not suitable for use in particle processing applications as the resulting dynamic range is insufficiently broad to capture the full range of light intensities caused by particle phenomena. Moreover, non-linearity in the signal requires complicated post-acquisition treatment of the signal to map the non-linear signal to true values. Furthermore, analog-to-digital electronics are not yet available that have both the bit-depth (e.g., up to 20 bits) and speed (e.g., up to 100 MHz) needed to accurately record a fast series of short light pulses with the desired dynamic range. Systems and devices taught herein provide large effective dynamic ranges (e.g., $10^7$, $10^8$, or more) with linear responsivity throughout the entire range using available electronic elements.

As used herein, the term "dynamic range" refers to the ratio of the maximum detectable light intensity to the minimum detectable light intensity discernible and measureable by a detector element for each choice of detector element parameters such as bias or control voltage. A detector element with a given dynamic range can accurately and repeatedly record sequentially-timed pulses of light at large and small intensity levels within the given range. For example, a detector element with a stated dynamic range of $10^8$ can accurately record a light pulse at an intensity of 100 µW followed directly by a light pulse at an intensity of 1 pW.

FIG. 1 illustrates a detector system 100 with extended dynamic range in accordance with various embodiments of the present disclosure. The detector system 100 includes a beam splitter 105, a first optical detector element 110, a second optical detector element 120, and a signal combiner 140. In some embodiments, the detector system 110 can include a first digitizer 112 or a second digitizer 122. In some embodiments, the detector system 110 can include one or more first optical elements 116 or one or more second optical elements 126. The signal combiner 140 can include hardware components, software components, or both such as by including one or more of a combiner module 150, a hardware-based signal combiner 145, a smoothing module 156, a feedback module 158, or a calibration module 159. The first optical detector element 110 has a first dynamic range and the second optical detector element 120 has a second dynamic range.

Pulsed or continuous light 102 from the optical source 101 passes through the beam splitter 105 and is split into multiple portions. A first portion 115 of the light falls on the first optical detector element 110, and a second portion 125 of the light falls on the second optical detector element 120. The first optical detector element 110 and the second optical detector element 120 are sensitive to different intensity ranges of light either because the two optical detector elements operate in different dynamic ranges or because the first portion 115 and second portion 125 of light are manipulated to create different intensity ranges as taught in greater detail below. The first optical detector element 110 generates a first detector output in response to receiving the first portion 115 of light, and the first detector output is communicated to the signal combiner 140. The second optical detector element 120 generates a second detector output in response to receiving the second portion 125 of light, and the second detector output is communicated to the signal combiner 140. The signal combiner 140 combines the first detector output and the second detector output to generate a combined signal. Thus, the detector system 100 generates the combined signal having a greater effective dynamic range than either detector element could achieve alone, i.e., greater than the first dynamic range or the second dynamic range. By generating the combined signal from two independently controlled detector elements, the detector system 100 can provide rapid detection of intermixed high-intensity and low-intensity signals received sequentially from the optical source 101 at the detector system 100.

In some embodiments, the first optical detector element 110, second optical detector element 120 and signal combiner 140 can be configured to handle high-speed signals corresponding to high-speed events. For example, the detector elements and signal combiner can be configured to combine signals corresponding to measurements (e.g., light measured from particles streaming through a cytometer) occurring on the order of magnitude of thousands per second, tens of thousands per second, hundreds of thousands per second, or millions per second. In some embodiments, the combined signal is configured to provide time-wise resolution of events or measurements in a range from 200 ns to 5 µs. In some embodiments, the combined signal is configured to provide time-wise resolution of events or measurements on the order of a few tens of microseconds. In some embodiments, the resolution of the detector system 100 include the first optical detector element 110, second optical detector element 120, and signal combiner 140 can process signals corresponding to individual photon events occurring on the order of picoseconds.

In some embodiments, the first optical detector element 110 is characterized by a coarse resolution and the second optical detector element 120 is characterized by a fine resolution (or vice versa). Thus, the detector system 100 can handle a "general" level of signal intensity of the light using first detector outputs from the coarse-resolution first optical detector element 110 and can switch to provide increased precision using second detector outputs from the fine-resolution second optical detector element 120. The increased precision signal may be present in the combined signal when the intensity of the light signal is such that it drops below the detection capability of the first detector element 110. In such a scenario, the detector system 100 is in a regime of using only the finer-resolution second detector outputs from the second optical detector elements 120 to measure low-intensity light that would not be detectable using the first optical detector element 110.

The first optical detector element 110 can include a photomultiplier tube or an array of photomultiplier tubes. In some embodiments, the first optical detector element 110 can include a silicon photomultiplier. The first optical detector element 110 can include avalanche photodiodes (APDs), multi-pixel photon counters, and other optical sensing devices or methodologies in some embodiments. The second optical detector element 120 can include a photomultiplier tube or an array of photomultiplier tubes. In some embodiments, the second optical detector element 120 can include a silicon photomultiplier. The second optical detector element 120 can include avalanche photodiodes (APDs), multi-pixel photon counters, and other optical sensing devices or methodologies in some embodiments. Unlike standard photomultiplier tubes, silicon photomultipliers have a short recovery time after exposure to a bright optical pulse. Silicon photomultipliers are significantly less susceptible to photobleaching when exposed to high light levels and are able to reliably detect dim objects immediately after exposure to bright, high-intensity light. The first optical detector element 110 and the second optical detector element 120 can provide analog or digital signal output.

The first optical detector element 110 can have a first gain value and the second optical detector element 120 can have a second gain value in some embodiments. The first gain value and the second gain value can be equal or unequal. In some embodiments, the signal combiner 140 can include a feedback circuit or module 158 that automatically adjusts or modulates the first gain value or the second gain value based upon an analysis of characteristics of the first detector output or the second detector output. For example, the feedback circuit 158 can reduce a gain value for an optical detector element if the detector output is saturated or clipped a certain number of times or over a certain period of time. In some embodiments, the first optical detector element 110, the second optical detector element 120, or both can include integrated transimpedance amplifiers to convert current signals to voltage signals. In other embodiments, external transimpedance amplifiers are provided that receive and convert the detector outputs before the outputs are communicated to digitizers or the signal combiner 140. In some embodiments, the feedback circuit or module 158 can control a gain value of the transimpedance amplifier.

In some embodiments, the first optical detector element 110 and the second optical detector element 120 can be smaller portions of larger detectors. For example, the first or second optical elements can be one or more pixels of a Si photomultiplier or a charge coupled device (CCD) or one or more photomultipliers in a larger array of photomultipliers. The first optical detector element 110 and the second optical detector element 120 can be elements of the same unitary detector in some embodiments. For example, the first optical detector element 110 can be a photomultiplier in an array of photomultipliers and the second optical detector element 120 can be a different photomultiplier in the same array of photomultipliers. In some embodiments, the first optical detector element 110 and the second optical detector element 120 can connect to or physically reside on a same printed circuit board. In other embodiments, the first optical detector element 110 can be part of a first detector and the second optical detector element 120 is part of a second detector wherein the first and second detectors are physically separated.

The first dynamic range of the first optical detector element 110 can be in a range of $10^3$ to $10^5$ in some embodiments. The second dynamic range of the second optical detector element 120 can be in a range of $10^3$ to $10^5$ in some embodiments. In some embodiments, the first dynamic range can span from single-photon detection levels to about 3 or 4 orders of magnitude higher intensity. Then, the second dynamic range can span from a level about 3 or 4 orders of magnitude greater than single-photon detection levels on the low end to intensities about 7 to 8 orders of magnitude greater than single-photon detection levels. As taught in greater detail below, the combined signal can have an effective dynamic range in a range from $10^7$ to $10^{10}$ orders of magnitude in some embodiments.

The first optical detector element 110 or the second optical detector element 120 can define an active sensing area over which light is received and detected by the detector element. In some embodiments, the first optical detector element 110 can include a first sensing area and the second optical detector element 120 can include a second sensing area. The first sensing area and the second sensing area can be the same shape or area or they can be different shapes or areas. In some embodiments, the first sensing area can be in a range from 0.5-3 mm$^2$. In some embodiments, the second sensing area can be in a range from 2-20 mm$^2$. In some embodiments, the first sensing area or the sensing area can be as large as 100 mm$^2$.

In some embodiments, the active sensing area can be divided into one or more pixels wherein each pixel has a pixel dimension. The sensing area can be square, rectangular, or any other polygonal or geometric shape in order to meet particular performance or space constraints. The pixel can be square, rectangular, or any other polygonal or geometrical shape in order to meet particular performance or space constraints. In some embodiments, the sensing area can be coterminous with a single pixel. In some embodiments, a pixel in the first optical detector element 110 can have a first pixel dimension and a pixel in the second optical detector element 120 can have a second pixel dimension. The first pixel dimension can be the same size as the second pixel dimension or the first pixel dimension can be a different size as the second pixel dimension in various embodiments. In some embodiments, the first pixel dimension is in a range from 5 to 30 micrometers. In some embodiments, the second pixel dimension is in a range from 30-75 micrometers.

In some embodiments, additional benefits are derived from the use of dissimilar sensing areas or pixel dimensions between the first optical detector element 110 and the second optical detector element 120. For example, detector elements (such as silicon photomultipliers) with different sized sensing areas or pixel dimensions can have different sensing characteristics. The sensitivity of a silicon photomultiplier, for example, is greatest when the pixels are large because there is less obscured active area. On the other hand, characteristics such as linearity of the dynamic range are improved for, e.g., silicon photomultiplier elements that have more pixels. In addition, dark counts increase proportional to the sensing area of the detector. In view of these countervailing considerations, an exemplary detector system 100 can utilize the first optical detector element 110 having a relatively smaller sensing area but relatively larger pixel dimension (e.g., sensing area of 1 mm$^2$ with pixel dimension of 50 μm) and the second optical detector element 120 having a relatively larger sensing area but relatively smaller pixel dimension (e.g., sensing area of 9 mm$^2$ with pixel dimension of 15 μm). In some implementations of this embodiment, the first detector element 110 receives the first portion 115 that comprises 99.9% of the total light 102 while the second optical detector element 120 receives the second portion 125 that comprises 0.1% of the total light 102. Consideration of the characteristics of each detector element in this way can enable optimization of the total effective dynamic range and sensitivity over that range.

The first detector output generated by the first optical detector element 110 can be an electrical signal such as an analog electrical signal. The second detector output generated by the second optical detector element 120 can be an electrical signal such as an analog electrical signal. In some embodiments, the analog electrical signals can be communicated directly to the signal combiner 140. For example, the signal combiner 140 can include analog electronics 145 that can process the first detector output or the second detector output as analog electrical signals.

In some embodiments, the first optical detector element 110 can transmit the first detector output to the first digitizer 112. For example, the first digitizer 112 can be an analog-to-digital converter that receives and digitizes the analog electrical signal to produce a first digital detector output. The first digitizer 112 can transmit the first digital detector output to the signal combiner 140. Similarly, the second optical detector element 122 can transmit the second detector output to the second digitizer 122. The second digitizer 122 can be an analog-to-digital converter that receives and digitizes the second detector output to produce the second digital detector output. The second digitizer 122 can transmit the second digital detector output to the signal combiner 140. In some embodiments, the first digitizer 112 and the second digitizer 122 can be separate channels of a single electronic element, i.e., an analog-to-digital converter. In some embodiments, the first digitizer 112 or the second digitizer 122 can be an 8-bit, 12-bit, 16-bit, or 20-bit analog-to-digital converter.

In some embodiments, the first detector output generated by the first optical detector element 110 can be a digital electrical signal. Likewise, the second detector output generated by the second optical detector element 120 can be a digital electrical signal. In such an embodiment, the detector system 100 need not include the first digitizer 112 or the second digitizer 122. Rather, the digital electrical signal from the first optical detector element 110 or the second optical detector element 120 can be communicated directly to the signal combiner 140.

In exemplary embodiments, the first detector output and the second detector output are generated in response to the same event. For example, the first portion 115 of light and the second portion 125 of light can often be derived from the same light 102 beam, path or pulse. When the first portion 115 and the second portion 125 of light derive from the same pulse, the resulting detector signals are temporally correlated as they arose from the same event, and the detector signals can be directly compared and combined. This arrangement enables faster and more accurate measurements of particle characteristics because multiple pulses are not required for each detector but, rather, a single pulse can be used.

The signal combiner 140 combines the first detector output (whether analog or digital) and the second detector output (whether analog or digital) to generate the combined signal. As noted above, the signal combiner 140 can include at least one of the combiner module 150 and the hardware-based signal combiner 145. In exemplary embodiments, the combiner module 150 can be implemented using a computing device 151. Exemplary computing devices 151 are taught in greater detail below with reference to FIG. 10. Generally, the combiner module 150 is suited to handle digital detector outputs from the detector elements while the hardware-based signal combiner 145 is suited to handle analog detector outputs from the detector elements. However, the combiner module 150 or the hardware-based signal combiner 145 can operate on either digital signals, analog signals, or mixed digital and analog signals without limitation in accordance with various embodiments taught herein. In some embodiments, the signal combiner 140 can resolve a first light pulse from the optical source 101 having an intensity within the first dynamic range and a second light pulse from the optical source 101 having an intensity within the second dynamic range wherein the first light pulse and the second light pulse are separated in time by less than 100 ns. In certain cases the intensity may only be able to be measured within one dynamic range (i.e. for the case where the signal level is not detectable by one of the detectors and may be considered to relate to a zero value in a high order signal context).

The combiner module 150 can receive the first digital detector output and the second digital detector output and create the combined detector signal in software. In some embodiments, a pre-determined threshold value is set where the combiner module 150 switches from the first detector output to the second detector output when generating the combined signal. For example, in a situation where the first optical detector element 110 has a very low gain setting and the second optical detector element 120 has a relatively higher gain setting, the first optical detector element 110 tends to be relatively more sensitive to high-intensity signals. Thus, the threshold can be set such that the combined signal is derived from the first detector output for values below a threshold value whereas the combined signal is derived from the second detector output above the threshold value. The pre-determined threshold value can be an intensity value, voltage value, a digital value, a numerical value or current value in some embodiments. In various embodiments, the threshold value can be implemented by the hardware-based signal combiner 145 or as a threshold value in the combiner module 150 to which digital outputs are compared. In the case of an analog implementation of the threshold value, the true combined signal can be obtained via a reverse transformation performed by the combiner module 150. In some embodiments, the combiner module 150 or hardware-based signal combiner 145 can at least sum the first detector output and the second detector output to produce the combined signal.

In some embodiments, the signal combiner 140 includes a smoothing module 156. The smoothing module 156 enables a smooth or continuous transition in the combined signal between a portion of the combined signal derived from the first detector output and a portion of the combined signal derived from the second detector output. In some embodiments, the smoothing module 156 can utilize a detector saturation input. Using the detector saturation input, the smoothing module 156 can take into account the saturation level of the first optical detector element 110 or the second optical detector element 120.

The smoothing module 156 can modify the combined signal at values near the threshold value to create a smooth transition between data correlated to the first detector output and data correlated to the second detector output. In some embodiments, the combiner module 150 multiplies the first detector output or the second detector output by a multiplication factor. The multiplication factor can make the first detector output and the second detector output span the same range of voltage or intensity values to ease combination of the two outputs and reduce discontinuity in the combined signal. In some embodiments, the multiplication factor can be approximately equal to the ratio of the intensities detected at the first optical detector element 110 and the second optical detector element 120.

In some embodiments, the signal combiner 140 includes a calibration module 159. The calibration module 159 can modify the multiplication factor. In various embodiments, the calibration module 159 can update the multiplication factor prior to a run of measurements by the detector system or on-the-fly during live measurement operations of the detector system 100. For example, the ratio of intensities detected for a same light pulse at the first optical detector element 110 and the second optical detector element 120 can be determined by the calibration module 159 using intensity-calibrated light pulses before a measurement run. Alternatively, the ratio could be measured on-the-fly by correlating single mid-intensity pulses detected at both detector elements and dividing the output values for the correlated pulse.

As taught above, the signal combiner 140 can include the hardware-based signal combiner 145. The hardware-based signal combiner 145 can include a logarithmic amplifier in some embodiments. The logarithmic amplifier can receive the first detector output and the second detector output and can generate the combined signal on a logarithmic scale. In some embodiments, the logarithmic amplifier can include a pre-defined threshold value that defines the point where the logarithmic amplifier switches between the first detector output and the second detector output when generating the combined signal.

The beam splitter 105 can divide the light from the optical source 101 equally or unequally in various embodiments. For example, the beam splitter 105 can divide the beam such that the same amount of light is directed towards the first optical detector element 110 and as is directed towards the second optical detector element 120. In some embodiments, the beam splitter 105 can direct significantly more light towards the first optical detector element 110 than the second optical detector element 120. For example, the beam splitter 105 can be a coated or uncoated mirror (i.e., a "pick-off" mirror) that transmits (or conversely reflects) 95% or more of the light towards the first optical detector element 110 and reflects (or transmits)<5% of the light towards the second optical detector element 120. In some embodiments, the first portion 115 of light can represent a proportion of light that is in a range from 50% to 99.9999% of the light 102 from the optical source 101. In some embodiments, the first portion 115 of light can represent a proportion of light that is in a range from 90% to 99.9999% of the light 102 from the optical source 101. The beam splitter 105 can include any suitable beam-splitting or beam dividing technology including plate or cube beamsplitters, polarization-sensitive elements such as quarter-wave or half-wave plates, diffraction gratings, prisms, spatial modulators, or spectrally-sensitive filters, mirrors or reflectors or partially transmitting optical elements of other types. The beam splitter 105 can be a passive optical element in some embodiments. In other embodiments, the beam splitter 105 can have an active component, e.g., the proportion of light divided into different directions by the beam splitter 105 can be changed using a modulation signal. For example, the beam splitter 105 can include liquid-crystal or digital micro-mirror components in some embodiments. Alternatively, beam splitter 105 can include acousto-optic modulation elements or electro-optic modulation elements in some embodiments.

The first optical elements 116 are disposed in the first portion 115 of the light beam between the beam splitter 105 and the first optical detector element 110. The second optical elements 126 are disposed in the second portion 125 of the light beam between the beam splitter 105 and the second optical detector element 120. The first optical elements 116 and the second optical elements 126 can include light beam shaping, light beam direction, or light beam selection elements in accordance with various embodiments. For example, light beam shaping elements can include spherical lenses, achromatic lenses, discrete or arrayed microlenses, meniscus lenses, projection lenses, objective lenses, any other suitable lens configuration, or fiber optics. Light beam direction elements can include mirrors, lenses, diffraction gratings, prisms, beamsplitters, waveplates, or other suitable elements. Light beam selection elements can alter characteristics of the light beam such as spectral content, intensity, angular properties or polarization. For example, light beam selection elements can include spectral selection elements such as spectral filters (e.g., low-pass, high-pass, or band-pass spectral filters), prisms, or diffraction gratings; spatial filters; attenuation elements such as neutral density filters; waveplates; fiber optics including polarization-maintaining fibers; or similar elements. Although only a single element is illustrated in FIG. 1, the skilled artisan will appreciate from the discussion herein that each of the first optical elements 116 and the second optical elements 126 can include one or more elements.

FIG. 2 illustrates first and second detector outputs for the first optical detector element 110 and the second optical detector element 120, respectively, according to some embodiments taught herein under high- and low-intensity illumination conditions. In this implementation of the detector system, most (e.g., >95%) of the light from the optical source 101 is directed by the beam splitter 105 to the first optical detector element 110 while only a small fraction of light from the optical source 101 is directed by the beam splitter 105 to the second optical detector element 120. In the left column, both detector outputs are illustrated for a low-intensity light pulse. Under these dim conditions, the first detector output is recordable as it is well within the linear response range of the first optical detector element 110. However, the second detector output is measured at such low values that the signal is lost among the noise of the second optical detector element 120. In the right column, both detector outputs are illustrated for a high-intensity light pulse. Under these bright conditions, the first detector output is clipped because the first optical detector element 110 has saturated at such a high level of light. However, the second detector output is normal as the second optical detector element 120 is receiving a very low percentage of the high intensity light and so it continues to operate in the normal, linear output range. In accordance with embodiments taught herein, these detector outputs are communicated to the signal combiner 140 where multiple detector outputs are combined to produce a single combined output that has sufficient signal-to-noise at low light levels while also avoiding saturation effects at high light levels.

Figure 3:
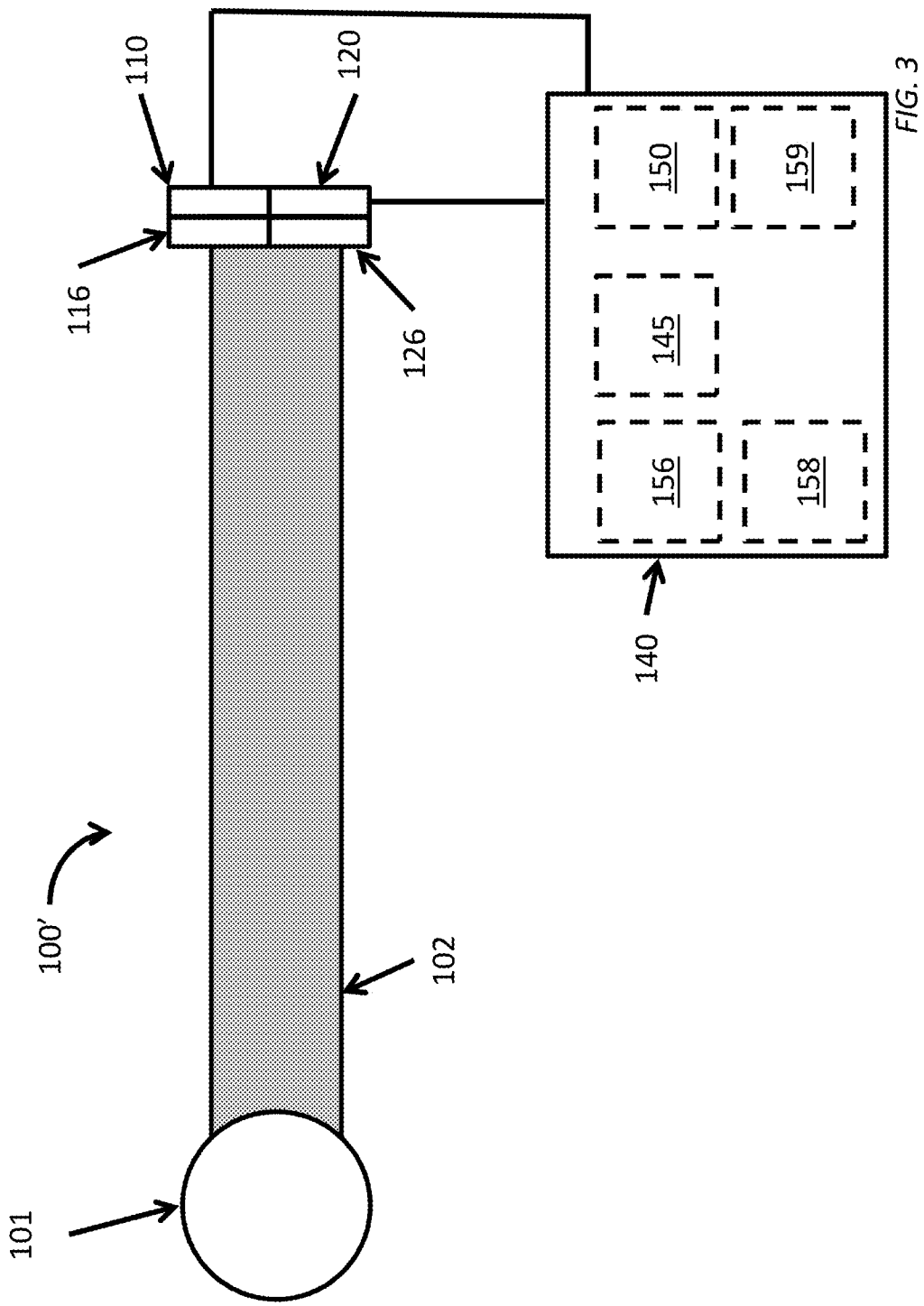
FIG. 3 illustrates first and second optical detector elements arranged as adjacent elements in a single physical detector in accordance with some embodiments of the present disclosure.

FIG. 3 illustrates an embodiment of the detector system 100' where the first optical detector element 110 and the second optical detector element 120 are part of a single detector. For example, the first optical detector element 110 and second optical detector element 120 can be different pixels or groups of pixels on a single CCD camera. As another example, the first optical detector element 110 and the second optical detector element 120 can be different silicon photomultipliers in a single array of silicon photomultipliers. In some embodiments, light 102 from the optical source 101 passes through the first optical element 116 in the form of a first attenuation element before reaching the first optical detector element 110. Similarly, light 102 from the optical source 101 passes through the second optical element 126 in the form of a second attenuation element before reaching the second optical detector element 120. The attenuation factors can differ for the first attenuation element and the second attenuation element. By providing different attenuation factors, the first and second attenuation elements can expose the first and second optical detector elements to different ranges of intensity from the optical source 101. For example, the first attenuation element can be a neutral density filter wherein the first attenuation factor is $10^0$ (i.e., no attenuation) or $10^1$. The second attenuation element can be a neutral density filter wherein the second attenuation factor is $10^4$ or $10^5$. In this system, the second optical detector element 120 will only provide detector output for relatively intense light as the light intensity will be dropped by 4 or 5 orders of magnitude by the second attenuation element.

Figure 4:
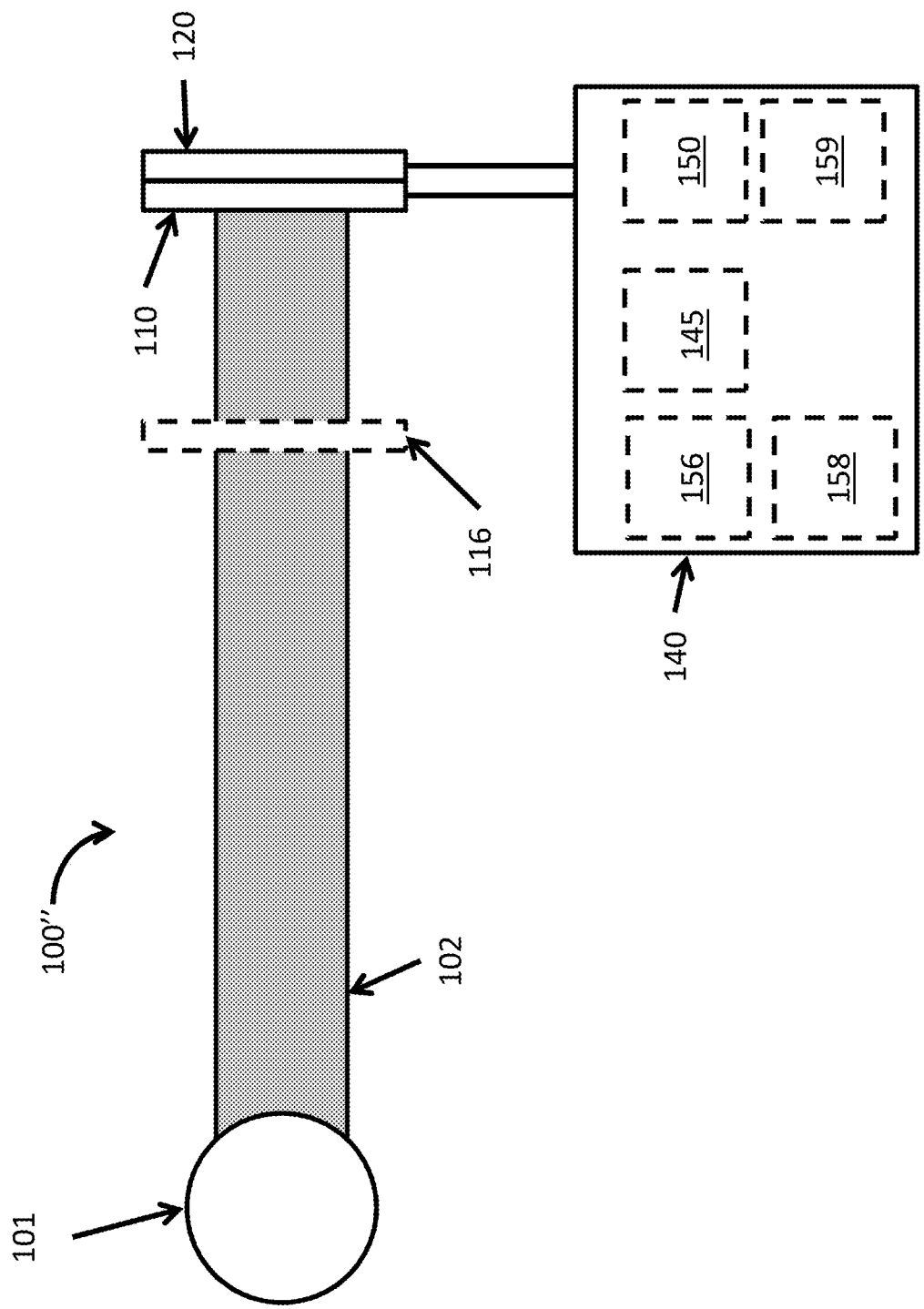
FIG. 4 illustrates first and second optical detector elements arranged as stacked elements in a single physical detector in accordance with some embodiments of the present disclosure.

FIG. 4 illustrates an embodiment of the detector system 100" including the first optical detector element 110 and the second optical detector element 120 in a stacked configuration. Light 102 passes from the optical source 101 and optionally through one or more optical elements 116. The light 102 then is received at the first optical detector element 110. The first portion of the light 102 is intercepted and detected by the first optical detector element 110, and the second portion of the light 102 passes through the first optical detector element 110. The second portion of light is received at the second optical detector element 120. Thus, the first optical detector element 110 performs a dual function of detecting some portion of light 102 while also acting as an attenuator for the light before it reaches the second optical detector element 102. In this way, the two detector elements are sensitive to different ranges of light intensity from the optical source 101, and the combination of the first detector output and the second detector output by the signal combiner 140 creates the combined signal with a greater apparent dynamic range than either of the detector elements could provide individually.

Figure 5:
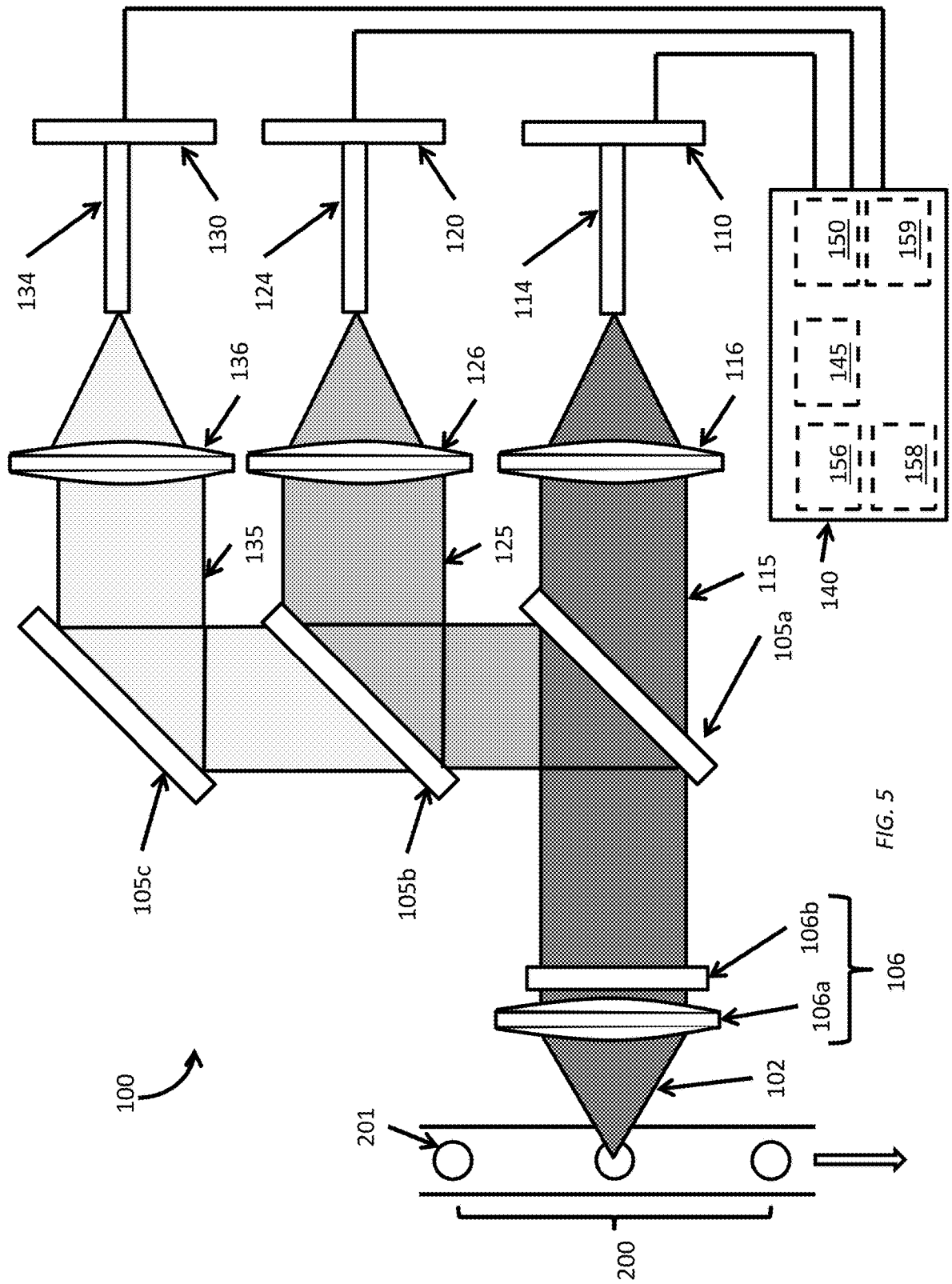
FIG. 5 illustrates an embodiment of the detector system optically coupled to a particle processing system in accordance with some embodiments of the present disclosure.

FIG. 5 illustrates the detector system 100 coupled to an interrogation zone 200 of a particle processing system in accordance with various embodiments taught herein. Here, light 102 emitted, scattered, or partially absorbed by particles 201 in the interrogation zone 200 takes the place of the optical source 101 taught in earlier embodiments. In this embodiment, the detector system 100 includes one or more optical elements 106 in the form of an objective lens 106a and a spectral filter 106b. The light 102 is divided by the first beam splitter 105a, and the first portion 115 of the light passes through a first lens 116 that focuses the first portion 115 of the light onto a first fiber optic 114. The first fiber optic 114 delivers the first portion 115 of the light to the first optical detector element 110. The second portion 125 of light is reflected from the a second beam splitter 105b and passes through a second lens 126 that focuses the second portion 125 of light onto a second fiber optic 124. The second fiber optic 124 delivers the second portion 125 of the light to the second optical detector element 120. A third portion 135 of the light is reflected from a third beam splitter 105c and passes through a third lens 134 that focuses the third portion 135 of light onto a third fiber optic 134. The third fiber optic 134 delivers the third portion 135 of the light to a third optical detector element 130. The first optical detector element 110, second optical detector element 120, and third optical detector element 130 communicate the first detector output, the second detector output, and a third detector output, respectively, to the signal combiner 140.

The particle processing system passes particles 201 or other objects to be interrogated through the interrogation zone 200. For example, the particle processing system can include a flow cytometer. In some embodiments, the flow cytometer is implemented using a microfluidic chip sorter including a microfluidic chip. In this type of system, the interrogation zone 200 can be a portion of a microchannel in the microfluidic chip wherein particles 201 flow single-file and are illuminated by an illumination source, e.g., a laser. As another example, the particle processing system can include a jet-in-air sorter wherein the interrogation zone 200 includes a portion of a fluid stream (enclosed or in free space) or droplets of a fluid stream. The stream or droplets include particles 201. The particles 201 scatter, emit, or otherwise interact with light from the illumination source to produce light 102 that is detected by the detector system 100. In various embodiments, the light 102 can include forward- or side-scattered light, extinction light, fluorescent light, or Raman scattered light. Analysis of the light 102 by the detector system 100 can identify one or more particle characteristics associated with the particles 201 including, but not limited to, optical characteristics (fluorescence, scatter, absorbance, extinction, reflection, refraction, polarization, luminescence, chemiluminescence, phosphorescence, spectral/color), electromagnetic characteristics, plasmonic characteristics, biological characteristics, molecular characteristics, mechanical characteristics, or the like. Particle characteristics may also include particle size, geometry, volume, surface area, shape, ellipticity, velocity, refractive index, granularity, porosity, conductivity, identity, type, phenotype, protein or molecular expression, biological pathway data, genetic content, live/dead state, function or the like.

In some embodiments, particles 201 flow through the interrogation zone 200 at a rate greater than 10,000 particles per second. In some embodiments, the number of particles 201 flowing through the interrogation zone 200 is in a range from 10,000-100,000 particles per second. In exemplary embodiments, the number of particle 201 flowing through the interrogation zone 200 is in a range from 50,000-100,000 particles per second. Each particle 201 emits, scatters, or partially absorbs illumination light to create a pulse of light 102 that is detected by the detector system 100. In some embodiments, the pulse of light 102 is in a range from 0.1-100 µs in width.

The objective lens 106a can gather light from one or more particles 201 in the interrogation zone 200 to be analyzed by the detector system 100. In some embodiments, the spectral filter 106b is used to isolate a wavelength range of interest, e.g., a band of wavelengths near a fluorescence peak. The first beam splitter 105a, second beam splitter 105b, and third beam splitter 105c can include neutral density beam splitters in some embodiments. The neutral density beamsplitters can predictably divide a light beam into portions having a pre-determined intensity ratio over a wide range of wavelengths and, in some embodiments, in a largely angle-independent fashion.

The first fiber optic 114, second fiber optic 124, and third fiber optic 134 enable location of the detector elements physically away from the particle processing system or other elements of the detector system 100. In some embodiments, the use of separate optical fibers for each portion of light to be detected advantageously enables the use of detector elements that are closely packed or mounted to a single detector or circuit board because fiber optics can generally be routed and packed more tightly than free-space optical elements.

Figure 6:
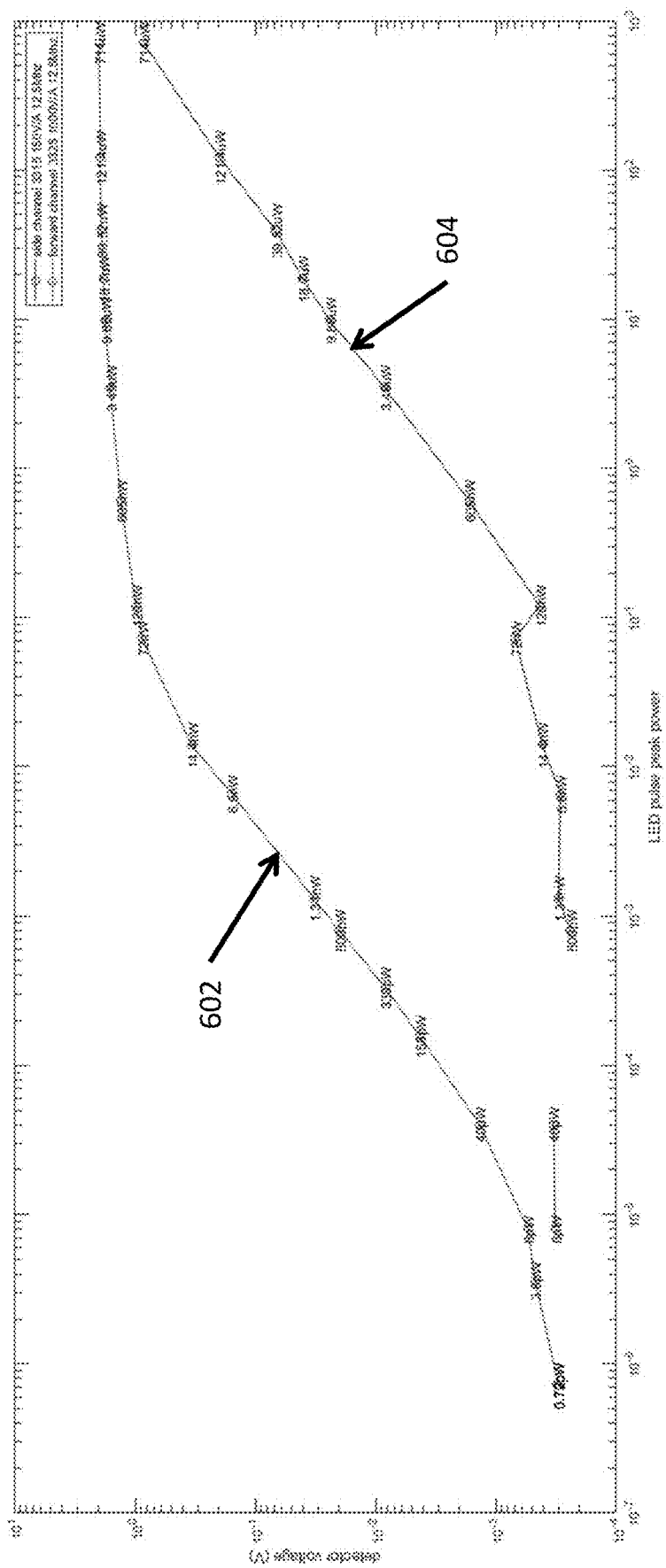
FIG. 6 illustrates measurements of peak values for first detector output and second detector output as functions of peak optical power of the optical source in accordance with some embodiments of the present disclosure.

FIG. 6 illustrates measurements of peak values of the first detector output 602 and the second detector output 604 as functions of peak optical power (in microwatts) of the optical source 101 in accordance with some embodiments of the present disclosure. For this measurement, a detector system 100 was constructed similar to that shown in FIG. 1 above wherein the first portion 115 of light comprised about 97% of the light 102 from the optical source 101 and the second portion 125 of light comprised about 3% of the light 102. The first optical detector element 110 was a silicon photomultiplier operating at 12.5 MHz and an output scaling of 1000 V/A (PM3325, Ketek GmbH, Munich, Germany). The second optical detector element 120 was a silicon photomultiplier operating at 12.5 MHz and an output scaling of 150 V/A (PM3315, Ketek GmbH). No first optical elements 106 were utilized in the setup but the second optical elements 106 included the attenuation element of a neutral density filter (ND1.3, i.e., a reduction in intensity of 1.3 orders of magnitude or approximately 95%). Because of the placement of the attenuation element before the second optical detector element 120, the proportion of the total amount of the light 102 received at the second optical detector element 120 was ~0.15%. The optical source 101 emitting the light 102 was a light emitting diode (LED) that was controlled to emit nearly Gaussian shaped pulses at different intensities with pulse length of about 1 µs.

As shown in FIG. 6, good sensitivity is achieved in the first detector output 602 in the linear portion of the curve from about $10^{-5}$ µW to between $10^{-2}$ and $10^{-1}$ µW. At higher power levels, the output is saturated and signals cannot be distinguished. The second detector output 604 has poor sensitivity below about $10^{-1}$ µW where the signals are all mired within detector noise. However, good sensitivity is achieved in the second detector output 604 in the linear portion of the curve between about $10^{-1}$ µW and $10^3$ µW. In other words, the first dynamic range and the second dynamic range of the respective detector elements are about 4 orders of magnitude. Therefore, the combined signal will have sensitivity over a dynamic range of between 8 and 9 orders of magnitude.

Figure 7:
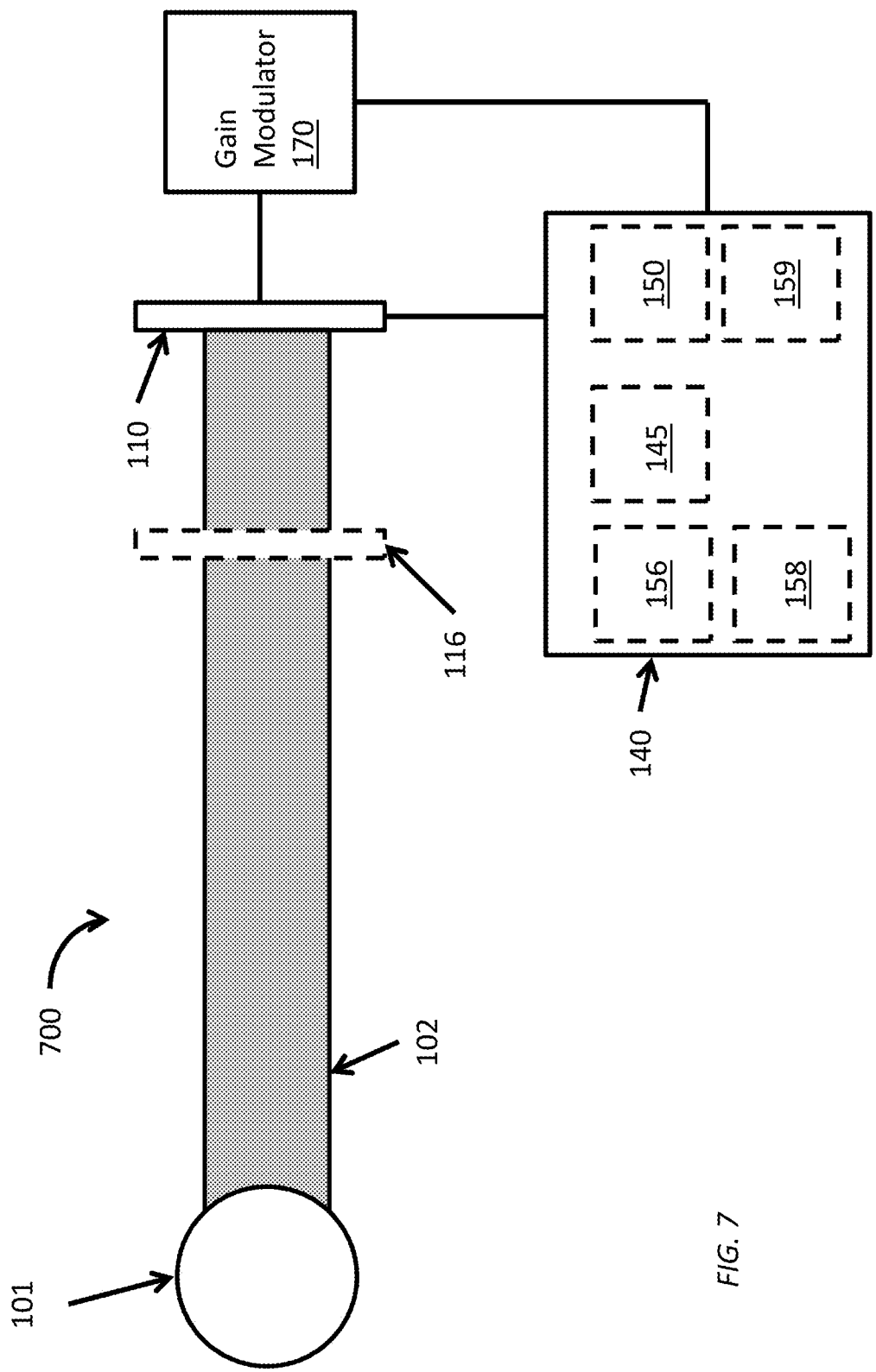
FIG. 7 illustrates the detector system including a gain modulator in accordance with various embodiments taught herein.

FIG. 7 illustrates the detector system 700 including a gain modulator 170 in accordance with various embodiments taught herein. The detector system 700 receives light 102 from the optical source 101 at the first optical detector element 110. The light 102 can pass through one or more optical elements 116 before reaching the first optical detector element 110 in some embodiments. The gain of the first optical detector element 110 is controlled by the gain modulator 170. Thus, the sensitivity of the first optical detector element 110 to light is altered such that the first optical detector element 110 can measure brighter or dimmer signals than would have been possible at only a single gain setting.

The gain modulator 170 can modulate the gain of the first optical detector element 110 according to, for example, a square wave where the high signal of the square wave corresponds to high gain and the low signal of the square wave corresponds to low gain. Other waveforms (whether periodic or non-periodic) are contemplated. The first optical detector element 110 produces the first detector output during periods of high gain setting, which sets a first dynamic range, and the second detector output during periods of low gain setting, which sets a second dynamic range. The first detector output and the second detector output are communicated to the signal combiner 140. In some embodiments, the signal combiner 140 controls the gain modulator to synchronize the gain modulation with periods where the first optical detector element 110 is outputting the first detector signal vs. the second detector signal. In other embodiments, synchronization is achieved by an external trigger or clock that controls both the signal combiner 140 and the gain modulator 170. In yet other embodiments, the gain modulator 170 controls triggering or clock management and communicates a trigger signal to the signal combiner 140. The signal combiner 140 combines the first detector output and the second detector output to create the combined signal with greater effective dynamic range than the first dynamic range or the second dynamic range.

Figure 8:
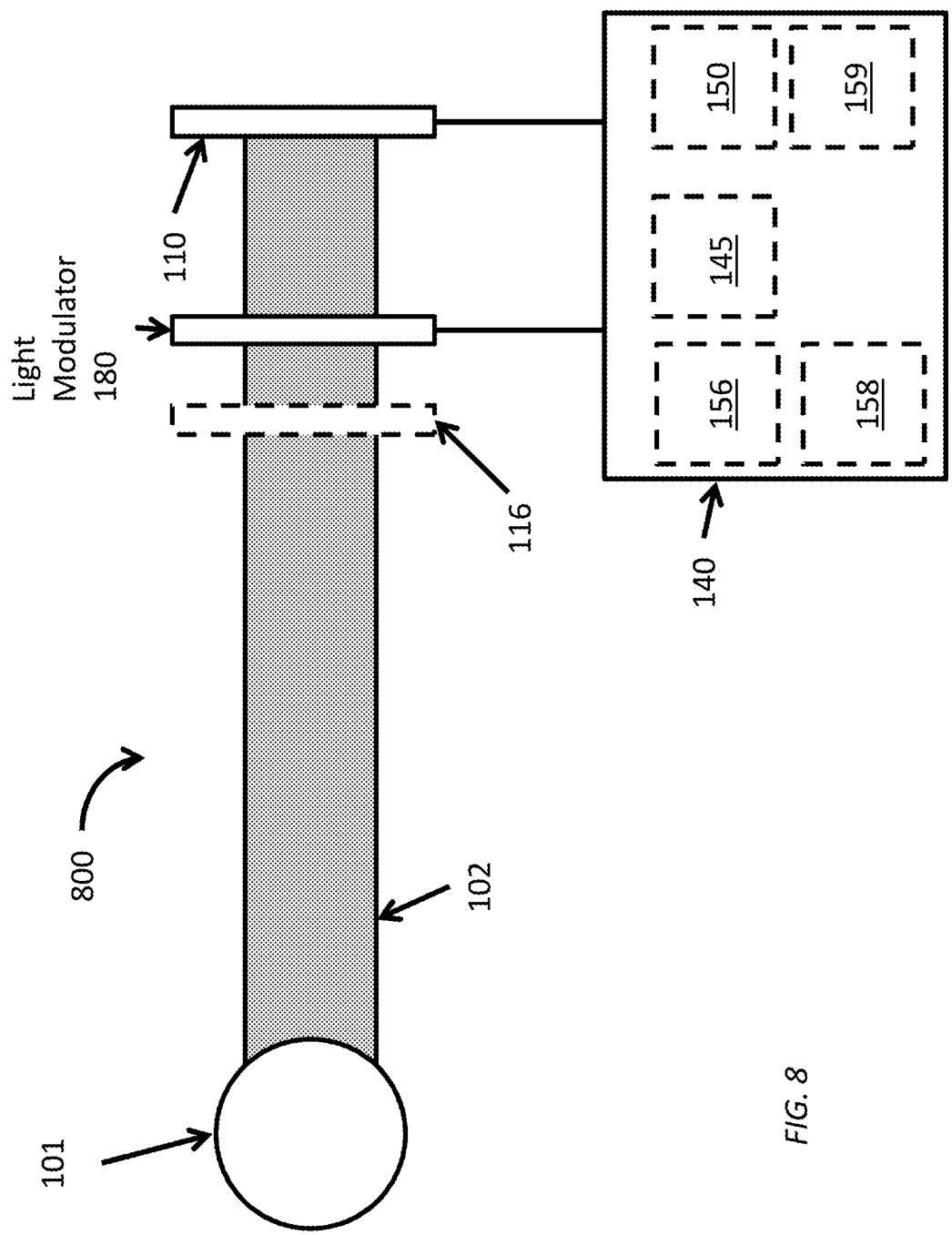
FIG. 8 illustrates the detector system with a light modulator in accordance with various embodiments taught herein

FIG. 8 illustrates the detector system 800 with a light modulator 180 in accordance with various embodiments taught herein. The detector system 800 receives light 102 from the optical source 101 at the first optical detector element 110. The light 102 can pass through one or more optical elements 116 before reaching the first optical detector element 110 in some embodiments. The light 102 also passes through a light modulator 180 before reaching the first optical detector element 110. The light modulator 180 can be a mechanical shutter, iris, or chopper in various embodiments. The light modulator 180 modulates the light 102 into portions of relatively higher intensity and relatively lower intensity. Because the light is modulated, the first optical detector element 110 can accurately measure both bright and dim signals at a single gain setting.

For example, the light modulator 180 can be a chopper with open sections (that block no light) and filter sections (that reduce light intensity using, e.g., a neutral density filter). The relatively higher intensity occurs when the light 102 is passing through the open sections while the relatively lower intensity occurs where the light 102 is passing through the filter sections of the light modulator 180. The first optical detector element 110 produces the first detector output during periods where the light 102 is at relatively higher intensity (corresponding to the first dynamic range) and produces the second detector output during periods where the light 102 is at a relatively lower intensity (corresponding to the second dynamic range). The first detector output and the second detector output are communicated to the signal combiner 140 that generates the combined signal having a greater effective dynamic range than either the first dynamic range or the second dynamic range.

The light modulator 180 modulates pulses of light 102 at a speed that is faster than the expected pulse length of the pulses. Therefore, each pulse of light has a portion of relatively higher intensity and of relatively lower intensity. The signal combiner 140 can control the light modulator 180 in some embodiments to synchronize periods of relatively high and low intensity with receipt of the first and second detector signals. In other embodiments, the light modulator 180 provides a trigger or clock signal to the signal combiner 140 to enable synchronization or an external clock or trigger can be used to synchronize both the signal combiner 140 and the light modulator 180.

Figure 9:
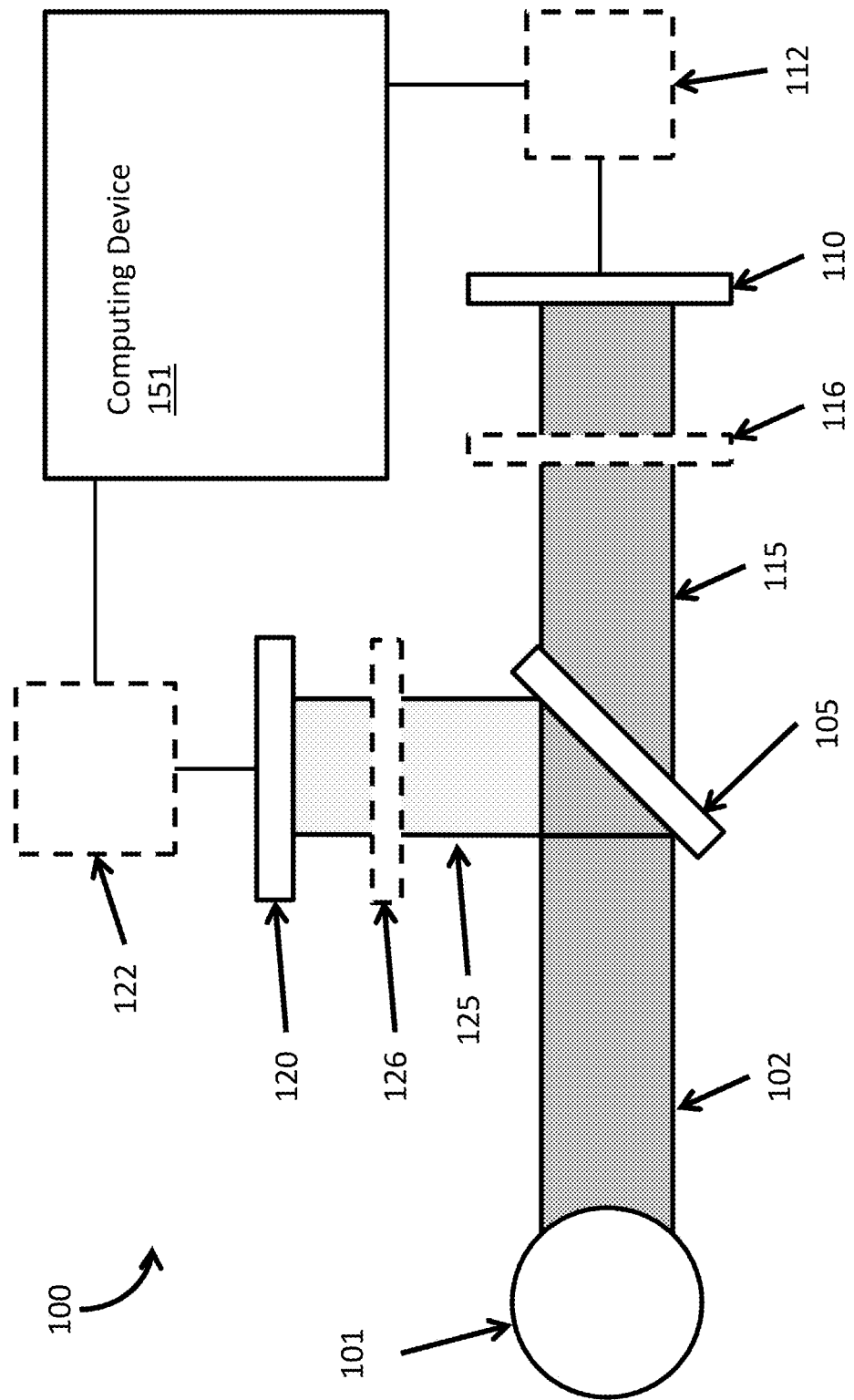
FIG. 9 illustrates the detector system without a signal combiner in accordance with various embodiments taught herein.

FIG. 9 illustrates the detector system without a signal combiner in accordance with various embodiments of the present disclosure. In this embodiment, the first detector output from the first optical detector element 110 and the second detector output from the second optical detector element 120 are transmitted directly or indirectly to the computing system 151. In other words, the computing system 151 can directly receive the detector outputs from the detector elements or the outputs can pass through other elements such as the first digitizer 112 and the second digitizer 122, transimpedance amplifiers, or other elements.

Figure 10:
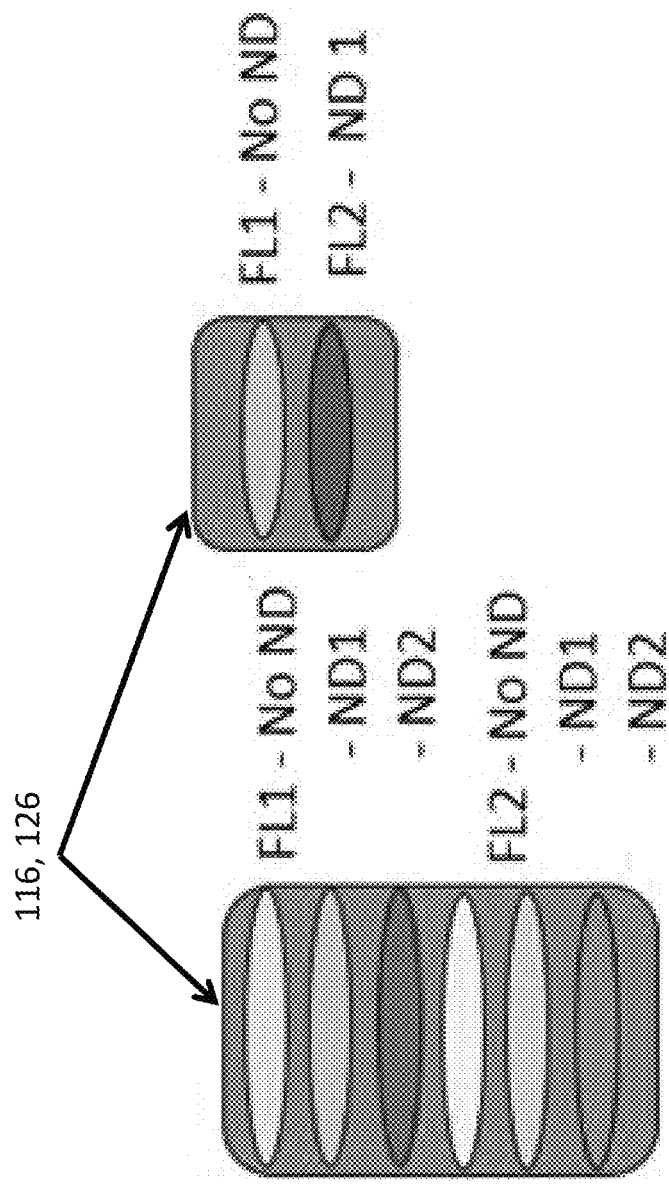
FIG. 10 illustrates exemplary configurations of first and second optical elements in accordance with various embodiments.

FIG. 10 illustrates exemplary configurations of first and second optical elements 116, 126 in accordance with various embodiments. As mentioned above, the first optical elements 116 or the second optical elements 126 or both can include neutral density (ND) filters. In this embodiment, multiple ND filters are arranged in front of each detector. In some embodiments, there may be no ND filter to enable the maximum allowable (i.e., naked) intensity of the corresponding portion of light to reach the detector for maximum sensitivity. In exemplary embodiments, the detector system 100 can be used to detect light from a particle passing through a detection region. The ND elements may be in front of a single optical detector element (e.g., pixel) or several optical detector elements such that the portion of light after the ND filters results in a "stepping" type signal for any given particle as it traverses the detection region. In other words, a "grey" or discrete scale is provided in this arrangement that can effectively create multiple measurements of the same particle as it moves over different regions. Thus, the light coming from the particle can be attenuated by different amounts at different optical detector elements to provide a way to measure the light from the particle at different "optical gain" factors. In this embodiment, the movement of the particle itself can provide the opportunity for multiple acquisitions so that particles emitting or scattering very intense light are measureable by optical detector elements receiving portions of light with high attenuation while particles emitting or scattering low intensity light are measureable by detector elements receiving portions of light having minimal or no attenuation.

Figure 11:
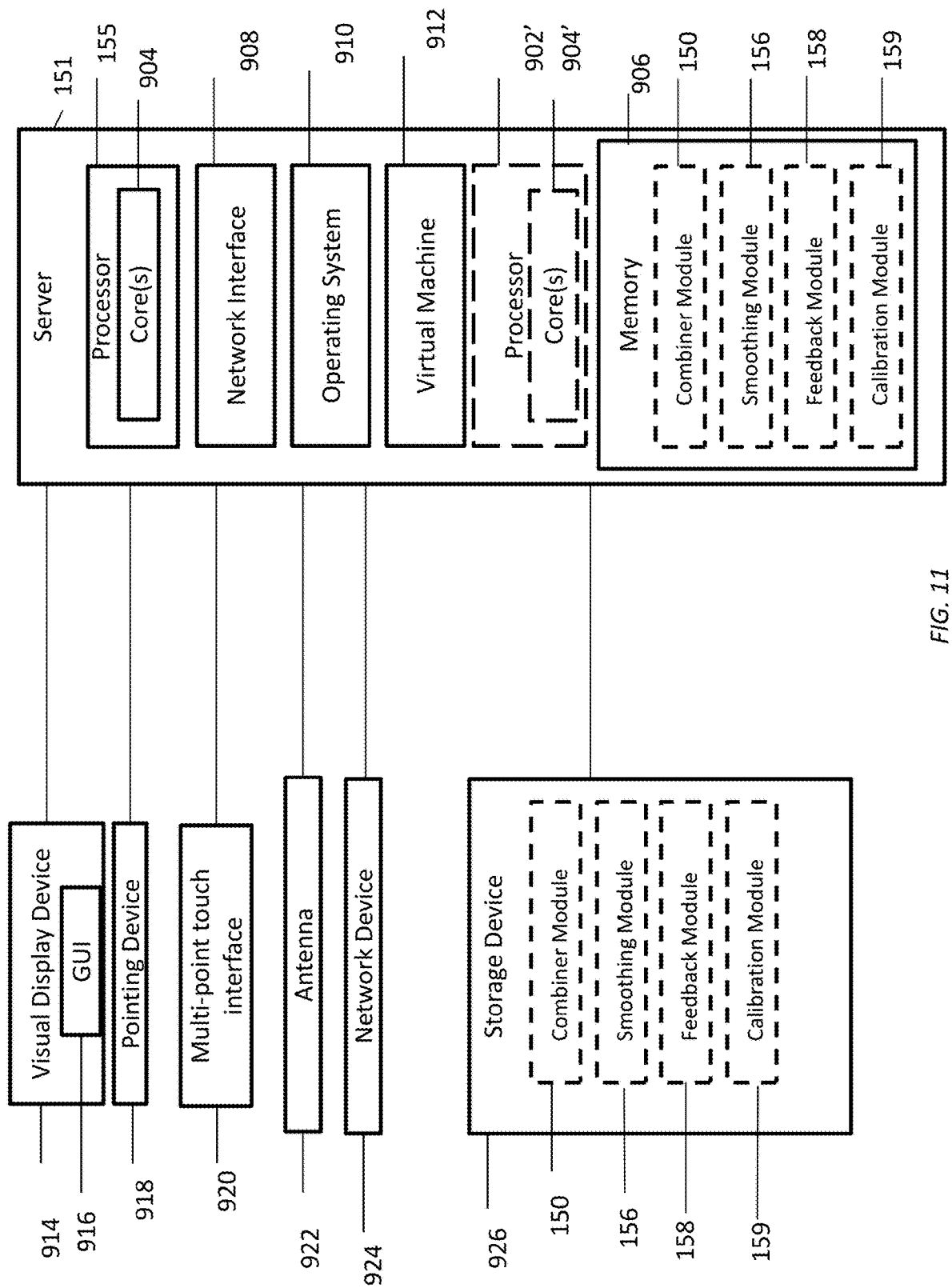
FIG. 11 illustrates an exemplary computing device for implementing some aspects of the systems and methods taught herein in various embodiments.

FIG. 11 is a block diagram of a computing device 151 for implementing exemplary embodiments of the present disclosure. The computing device 151 includes one or more non-transitory computer-readable media for storing one or more computer-executable instructions or software modules for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 906 included in the computing device 151 may store computer-readable and computer-executable instructions or software for implementing exemplary operations of the computing device 151. For example, the software can include the combiner module 150, calibration module 159, feedback module 158, smoothing module 156, or other executable instructions to perform the operations as taught above with reference to FIGS. 1 and 3-5. The software can also be stored in a storage device 926 as taught below. The computing device 151 also includes configurable and/or programmable processor 155 and associated core(s) 904, and optionally, one or more additional configurable and/or programmable processor(s) 902' and associated core (s) 904' (for example, in the case of computer systems having multiple processors/cores), for executing computer-readable and computer-executable instructions or software stored in the memory 906 and other programs for implementing exemplary embodiments of the present disclosure. Processor 155 and processor(s) 902' may each be a single core processor or multiple core (404 and 404') processor. Either or both of processor 155 and processor(s) 902' may be configured to execute one or more of the instructions taught in connection with the computing device 151.

Virtualization may be employed in the computing device 151 so that infrastructure and resources in the computing device 151 may be shared dynamically. A virtual machine 912 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 151 through a visual display device 914, such as a computer monitor, which may display one or more graphical user interfaces 916, a multi-point touch interface 920 or a pointing device 918.

The computing device 151 may also include one or more storage devices 926, such as a hard-drive, CD-ROM, or other computer readable media, for storing data and computer-readable instructions and/or software that implement exemplary embodiments of the present disclosure. For example, the storage device 426 can also store the combiner module 150, calibration module 159, feedback module 158, smoothing module 156, or other executable instructions in some embodiments.

The computing device 151 can include a network interface 908 configured to interface via one or more network devices 924 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 151 can include one or more antennas 922 to facilitate wireless communication (e.g., via a network interface 908) between the computing device 151 and a network. The network interface 908 may include a built-in network adapter, network interface card, PCMCIA network card, card bus network adapter, wireless network adapter, USB network adapter, modem or any other device suitable for interfacing the computing device 151 to any type of network capable of communication and performing the operations taught herein.

The computing device 151 may run any operating system 910, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 151 and performing the operations taught herein. In exemplary embodiments, the operating system 910 may be run in native mode or emulated mode. In an exemplary embodiment, the operating system 910 may be run on one or more cloud machine instances.

What is claimed is:

1. A detector system with extended dynamic range, comprising:
    a first detector having:
        a first optical detector element having a first dynamic range that receives a first portion of light from an optical source, the first optical detector element generating a first detector output; and
        a second optical detector element having a second dynamic range that receives a second portion of light from the optical source, the second optical detector element generating a second detector output; and
    a signal combiner that receives the first detector output and the second detector output and generates a combined signal having greater effective dynamic range than the first dynamic range and the second dynamic range, the signal combiner being configured to modulate the gain of the first optical detector element and the second optical detector element.

2. The system of claim 1, further comprising a spectral selection element that limits the range of wavelengths in the first portion of light or the second portion of light.

3. The system of claim 2, wherein the spectral selection element is at least one of a spectral filter, a prism, or a diffraction grating.

4. The system of claim 1, wherein the first portion of light is in a range of 50% to 99.99% of a total light output from the optical source.

5. The system of claim 4, wherein the first portion of light is in a range of 90% to 99.99% of the total light output from the optical source.

6. The system of claim 1, wherein the first optical detector has a first sensing area and the second optical detector has a second sensing area.

7. The system of claim 6, wherein the first sensing area is equal to the second sensing area.

8. The system of claim 6, wherein the first sensing area is in a range from 0.5-3 $mm^2$ and the second sensing area is in a range from 2-20 $mm^2$.

9. The system of claim 1, wherein the first optical detector element has a first pixel dimension and the second optical detector element has a second pixel dimension.

10. The system of claim 9, wherein the first pixel dimension is equal to the second pixel dimension.

11. The system of claim 9, wherein the first pixel dimension is in a range from 5-30 micrometers and the second pixel dimension is in a range from 30-75 micrometers.

12. The system of claim 1, further comprising a first attenuation element having a first attenuation factor disposed between the optical source and the first optical detector element.

13. The system of claim 12, further comprising a second attenuation element having a second attenuation factor disposed between the optical source and the second optical detector element.

14. The system of claim 13, wherein the first and second attenuation factors are different.

15. The system of claim 1, wherein the signal combiner comprises a hardware-based signal combiner including a logarithmic amplifier.

16. The system of claim 15, wherein the logarithmic amplifier includes a pre-defined threshold value at which the logarithmic amplifier switches between the first detector output and the second detector output when generating the combined signal.

17. The system of claim 1, wherein the signal combiner comprises a computing system including a processor, a memory, and a combiner module that, when executed, causes the processor to:
    receive the first detector output and the second detector output;
    generate the combined signal by combining the first detector output and the second optical detector.

18. The system of claim 17, wherein generating the combined signal includes:
    using the first detector output to generate the combined signal for values below a threshold value; and
    using the second detector output to generate the combined signal for values above the threshold value.

19. The system of claim 17, wherein generating the combined signal includes:
    modifying the combined signal for values near the threshold value using a smoothing module.

20. The system of claim 19, wherein the smoothing module modifies the combined signal based upon a detector saturation input.

21. The system of claim 1, further comprising a calibration module configured to calibrate the first detector output or the second detector output in real time.

22. The system of claim 1, wherein the optical source includes illuminated particles flowing through an interrogation zone in a particle processing system.

23. The system of claim 22, wherein the particle processing system is a jet in air sorter.

24. The system of claim 22, wherein the particle processing system is a flow cytometer.

25. The system of claim 24, wherein the flow cytometer is implemented using a microfluidic chip sorter.

26. The system of claim 1, wherein the first optical detector element comprises a first silicon photomultiplier and the second optical detector element comprises a second silicon photomultiplier.

27. The system of claim 1, wherein the signal combiner resolves a first light pulse from the optical source having an intensity within the first dynamic range and a second light pulse from the optical source having an intensity within the second dynamic range, the first light pulse and the second light pulse separated in time by less than 100 ns.

28. The system of claim 1, wherein the second portion of light passes through the first optical detector element before reaching the second optical detector element.

29. The system of claim 1, wherein the effective dynamic range of the combined signal is in a range from $10^7$ and $10^{10}$ orders of magnitude.

30. A method of detecting light over an extended dynamic range, comprising:
- receiving a first portion of light from an optical source at a first optical detector element of a first detector, the first optical detector element having a first dynamic range and generating a first detector output;
- receiving a second portion of light from the optical source at a second optical detector element of the first detector, the second optical detector having a second dynamic range and generating a second detector output;
- combining the first detector output and the second detector output to generate a combined signal having greater effective dynamic range than the first dynamic range and the second dynamic range; and
- modulating the gain of the first optical detector element and the second optical detector element.

31. The method of claim 30, further comprising:
spectrally filtering light from the optical source to limit the range of wavelengths in the first portion of light or the second portion of light.

32. The method of claim 31 wherein spectrally filtering light includes passing the light through at least one of a spectral filter, a prism, or a diffraction grating.

33. The method of claim 30, wherein the first portion of light is in a range of 50% to 99.99% of a total light output from the optical source.

34. The method of claim 33, wherein the first portion of light is in a range of 90% to 99.99% of the total light output from the optical source.

35. The method of claim 30, wherein the first optical detector has a first sensing area and the second optical detector has a second sensing area.

36. The method of claim 35, wherein the first sensing area is equal to the second sensing area.

37. The method of claim 35, wherein the first sensing area is in a range from 0.5-3 mm² and the second sensing area is in a range from 2-20 mm².

38. The method of claim 30, wherein the first optical detector element has a first pixel dimension and the second optical detector element has a second pixel dimension.

39. The method of claim 38, wherein the first pixel dimension is equal to the second pixel dimension.

40. The method of claim 38, wherein the first pixel dimension is in a range from 5-30 micrometers and the second pixel dimension is in a range from 30-75 micrometers.

41. The method of claim 30, further comprising attenuating the first portion of light using a first attenuation element having a first attenuation factor disposed between the optical source and the first optical detector element.

42. The method of claim 41, further comprising attenuating the second portion of light using a second attenuation element having a second attenuation factor disposed between the optical source and the second optical detector element.

43. The method of claim 42, wherein the first and second attenuation factors are different.

44. The method of claim 30, wherein combining the first and second detector outputs includes using a logarithmic amplifier to generate the combined signal.

45. The method of claim 44, wherein using the logarithmic amplifier to generate the combined signal includes switching between the first detector output and the second detector output at a pre-defined threshold value.

46. The method of claim 30, wherein the signal combiner comprises a computing system including a processor, a memory, and a combiner module and wherein generating the combined signal includes using the combiner module.

47. The method of claim 46, wherein generating the combined signal includes:
- using the first detector output to generate the combined signal for values below a threshold value; and
- using the second detector output to generate the combined signal for values above the threshold value.

48. The method of claim 46, wherein generating the combined signal includes:
- modifying the combined signal for values near the threshold value using a smoothing module.

49. The method of claim 48, wherein using the smoothing module comprises modifying the combined signal based upon a detector saturation input.

50. The method of claim 30, further comprising calibrating the first detector output or the second detector output in real time.

51. The method of claim 30, wherein the optical source includes illuminated particles flowing through an interrogation zone in a particle processing system.

52. The method of claim 51, wherein the particle processing system is a jet in air sorter.

53. The method of claim 51, wherein the particle processing system is a flow cytometer.

54. The method of claim 53, wherein the flow cytometer is implemented using a microfluidic chip sorter.

55. The method of claim 30, wherein the first optical detector element comprises a first silicon photomultiplier and the second optical detector element comprises a second silicon photomultiplier.

56. The method of claim 30, further comprising resolving a first light pulse from the optical source having an intensity within the first dynamic range and a second light pulse from the optical source having an intensity within the second dynamic range, the first light pulse and the second light pulse separated in time by less than 100 ns.

57. The method of claim 30, wherein the second portion of light passes through the first optical detector element before reaching the second optical detector element.

58. The method of claim 30, wherein the effective dynamic range of the combined signal is in a range from $10^7$ and $10^{10}$ orders of magnitude.

* * * * *